Figure 1:
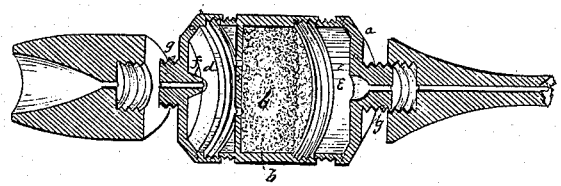
Figure 2:
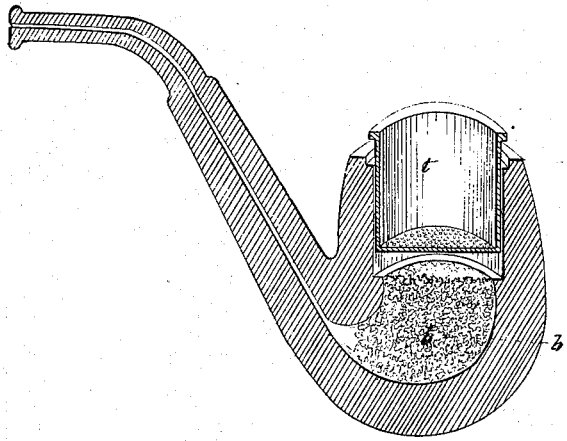

W. E. TURNER.

Compound for Use in Tobacco-Pipes.

No. 134,713.                          Patented Jan. 7, 1873.

WITNESSES                                    INVETOR

Eli S. Glover.                        Will E. Turner M.D.
G. C. Snow

UNITED STATES PATENT OFFICE.

WILL. E. TURNER, OF NEOSHO FALLS, KANSAS.

IMPROVEMENT IN COMPOUNDS FOR USE IN TOBACCO-PIPES.

Specification forming part of Letters Patent No. 134,713, dated January 7, 1873.

*To all whom it may concern:*

Be it known that I, WILL. E. TURNER, M. D., of Neosho Falls, State of Kansas, have invented a certain new Improvement in Mode of Denicotinizing and Deodorizing Tobacco-Smoke, of which the following is a specification:

My invention relates to a chemical preparation, compound, or mixture to be used in pipes, pipe-stems, and cigar-holders, in any convenient mode or form, to denicotinize and deodorize tobacco-smoke, and thus prevent the injurious principle or ingredients of tobacco, nicotine, and empyreumatic oil from entering the mouth, thus preventing many forms of diseases, both direct and indirect, such as dyspepsia, heart disease, impaired senses, impaired circulation of the blood, and disturbed intellect, and all forms of nervous disorders now consequent on the present mode of smoking.

My invention consists in the use of the chemical ingredients or compounds of citric, tartaric, tannic, and gallic acids with cinnamon, Florida water, or clove water, and pure glycerine, in the following proportions: Of glycerine, five parts; of the water, three parts; and either of the acids named, in proportion, of tannic acid from four to six grains to the fluid dram of glycerine and water; citric or tartaric acid, six grains to the fluid dram; gallic acid, from two to four grains to a dram; although I do not claim it to be imperatively necessary to confine myself to the exact amount of each acid herein named, as it may be of an amount more or less to the fluid dram of glycerine and water.

The tobacco-smoke, in passing through the compound or anything holding the compound, is divested of its empyreumatic oil in the chemical compound, thus deodorizing it, and the nicotine is deposted in the form of tannate, citrate, tartrate, and gallate of nicotine, according to which of the above acids are used. Thus the denicotinizing and deodorizing is accomplished.

I claim as my invention—

The above chemical ingredients or compound, as and for the purpose hereinbefore set forth.

WILL. E. TURNER.

Witnesses:
 E. S. GLOVER,
 L. M. TURNER.